US006712562B2

(12) United States Patent
Svensson

(10) Patent No.: US 6,712,562 B2
(45) Date of Patent: *Mar. 30, 2004

(54) MILLING TOOL AND MILLING INSERTS HAVING IMPACT PROTECTION FOR MAIN CUTTING EDGES

(75) Inventor: Mikael Svensson, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/055,967

(22) Filed: Jan. 28, 2002

(65) Prior Publication Data

US 2002/0102139 A1 Aug. 1, 2002

(30) Foreign Application Priority Data

Jan. 26, 2001 (SE) .............................. 0100211

(51) Int. Cl.[7] .............................. B23C 5/20; B23D 1/12
(52) U.S. Cl. .......................................... 407/43; 407/113
(58) Field of Search .............................. 107/113, 114, 107/115, 116

(56) References Cited

U.S. PATENT DOCUMENTS

| 4,632,607 A | | 12/1986 | Pantzar | |
|---|---|---|---|---|
| 4,966,500 A | | 10/1990 | Tsujimura et al. | |
| 5,145,295 A | * | 9/1992 | Satran | 407/113 |
| 5,505,569 A | * | 4/1996 | Gustafsson et al. | 407/113 |
| 5,718,540 A | | 2/1998 | Satran et al. | |
| 5,720,583 A | | 2/1998 | Bohnet et al. | |
| 6,053,672 A | * | 4/2000 | Satran et al. | 407/113 |
| 6,079,912 A | * | 6/2000 | Rothballer | 407/114 |
| 6,257,807 B1 | * | 7/2001 | Heinloth | 407/113 |
| D460,768 S | * | 7/2002 | Svensson | D15/139 |

FOREIGN PATENT DOCUMENTS

| DE | 44 11 475 | 10/1995 |
|---|---|---|
| EP | 0 457 488 | 11/1991 |

* cited by examiner

Primary Examiner—A. L. Wellington
Assistant Examiner—Dana Ross
(74) Attorney, Agent, or Firm—Burns, Doane, Swecker & Mathis, LLP

(57) ABSTRACT

A milling tool includes a holder rotatable about an axis and carrying a plurality of cutting inserts at a forward end thereof. Each insert includes a plurality of main cutting edges, and secondary cutting edges disposed on protruding corners of the insert. Each main cutting insert has a clearance surface located therebehind considered with reference to a direction of rotation of the holder. Each clearance surface has surface portion defining a convex profile, the convex profile forming a crest or transition. During a cutting operation, one of the main cutting edges constitutes an axially forwardmost inactive cutting edge. The transition of the clearance surface associated with that inactive edge is disposed axially forwardly with respect to the inactive cutting edge to prevent the inactive cutting edge from impacting against a workpiece.

11 Claims, 8 Drawing Sheets

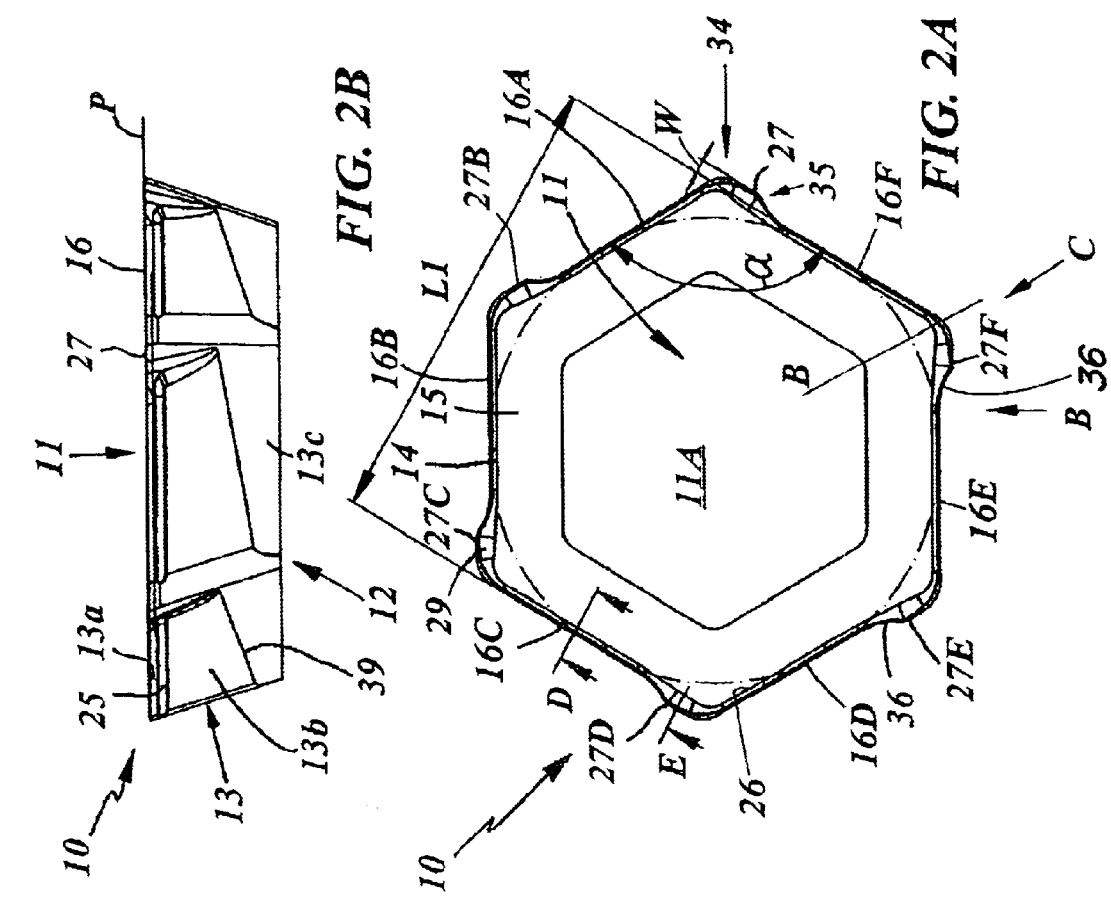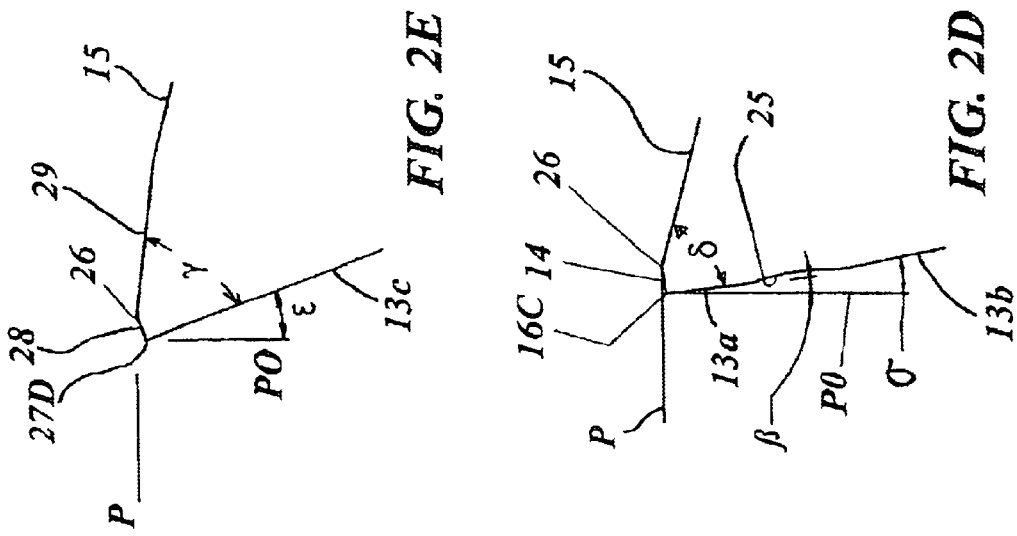

MILLING TOOL AND MILLING INSERTS HAVING IMPACT PROTECTION FOR MAIN CUTTING EDGES

This application claims priority under 35 U.S.C. §119 and/or 365 to patent application Ser. No. 0100211-2 filed in Sweden on Jan. 26, 2001, the entire content of which is hereby incorporated by reference.

FIELD OF THE INVENTION

The present invention relates to a milling insert and a milling tool, used especially for roughing operations, wherein the milling insert has main cutting edges and secondary (wiper) cutting edges.

BACKGROUND OF THE INVENTION

U.S. Pat. No. 4,966,500 shows a milling cutter having hexagonal cutting inserts. Each cutting insert has a main cutting edge, an end cutting edge and a radially internal cutting edge. The radially internal cutting edge is intended to cut during ramping of the workpiece.

U.S. Pat. No. 4,632,607 shows a square milling Insert having four pairs of cutting edges and having protruding secondary cutting edges (i.e., wiper edges). The milling tool produces perpendicular corners in the workpiece.

The main cutting edges of those prior cutting inserts are particularly sensitive to impacts and vibrations. For example, FIG. 4A depicts a cutting insert 100 according to U.S. Pat. No. 4,632,607 during a milling operation performed on a workpiece W, with a feed direction F. The insert includes main cutting edges 102A, 102B, 102C, 102D which are associated with respective secondary cutting edges 104A, 104B, 104C, 104D. In FIG. 4A the milling is being performed by the active main edge 102D and the active secondary edge 104D associated therewith. During the milling operation, the secondary edge 104D can travel off an edge 106 of the workpiece (see FIG. 4B). When that occurs, a built-up spring force that may exist in the milling machine can press the insert downwardly, whereupon the inactive main cutting edge 102A disposed adjacent to the active secondary cutting edge could impact against the workpiece, as shown in FIG. 4B, possibly with enough force to become chipped as a result.

OBJECTS OF THE INVENTION

An object of the present invention is to provide a milling insert and a milling tool mainly for roughing operations, which are less sensitive to impacts and vibrations.

Another object of the present invention is to provide a durable milling insert.

Still another object of the present invention is to provide a milling insert that provides impact protection for the main cutting edges in relation to the workpiece.

SUMMARY OF THE INVENTION

The present invention relates to a milling insert comprising a body having upper and bottom surfaces interconnected by an edge surface structure. A transition between the upper surface and the edge surface structure forms a main cutting edge structure comprised of a plurality of identical main cutting edges. The body further includes a plurality of protruding portions. Each protruding portion is disposed at a corner toward which two of the main cutting edges converge. Each protruding portion forms a secondary cutting edge disposed outside of an intersection of imaginary extensions of the two main cutting edges. The secondary cutting edge is joined to a first of the two main cutting edges by a transition edge. The edge surface structure forms a plurality of clearance surfaces for respective ones of the main cutting edges. Each clearance surface includes a first portion extending from a respective main cutting edge, a second portion extending from the first portion, and a third portion extending from the second portion. The first and second portions together form a generally convex profile.

The invention also pertains to a tool which includes a holder that carries a plurality of the milling inserts. The holder is rotatable about an axis. A plane which is oriented perpendicular to the axis and which contains a transition of a generally concave clearance surface associated with an axially forwardmost inactive main cutting edge, is oriented axially forwardly of such axially forwardmost inactive main cutting edge.

BRIEF DESCRIPTION OF THE DRAWINGS

These objects and advantages of the invention will be apparent from the following detailed description of preferred embodiments of a milling insert according to the present invention in connection with the figures.

FIG. 2A shows a plane view of a cutting insert according to the present invention.

FIGS. 2B and 2C show the cutting insert in respective side views in the direction of arrows B and C, respectively, in FIG. 2A.

FIG. 2D shows a cross-section along the line D—D in FIG. 2A.

FIG. 2E shows a cross-section along line E—E in FIG. 2A.

DETAILED DESCRIPTION OF PREFERRED EMBODIMENTS OF THE INVENTION

In FIGS. 1A–1D there is shown a milling tool 30 according to the present invention used foremost for rough milling operations. The tool comprises a milling cutter body or holder 31 and a plurality of milling inserts 10 according to the present invention. The holder 31 has a plurality of adapters or cassettes 32 for receiving the cutting inserts.

Figure 1A:
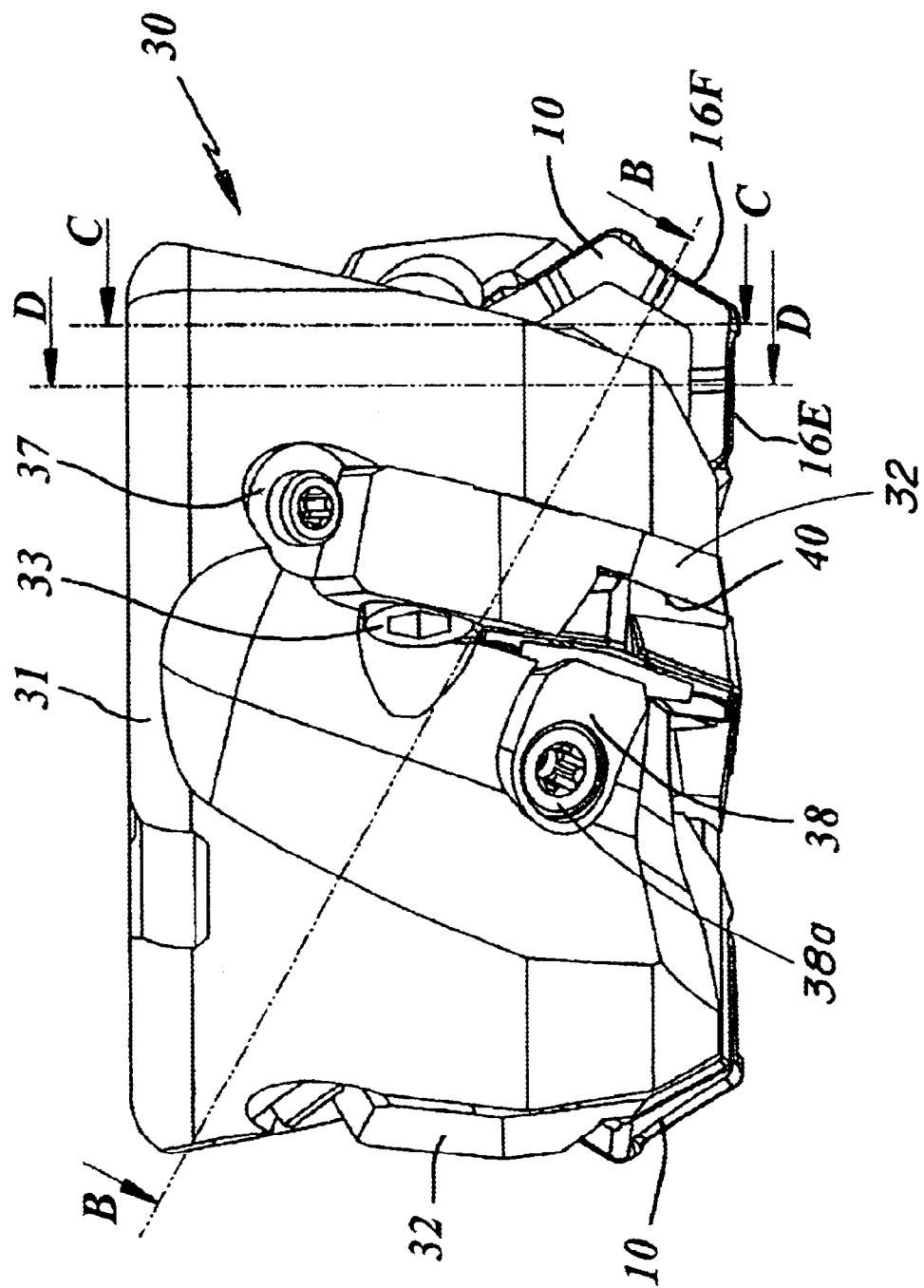
FIG. 1A shows an embodiment of a milling tool according to the present invention, in a side view.
Figures 1B, 1E:
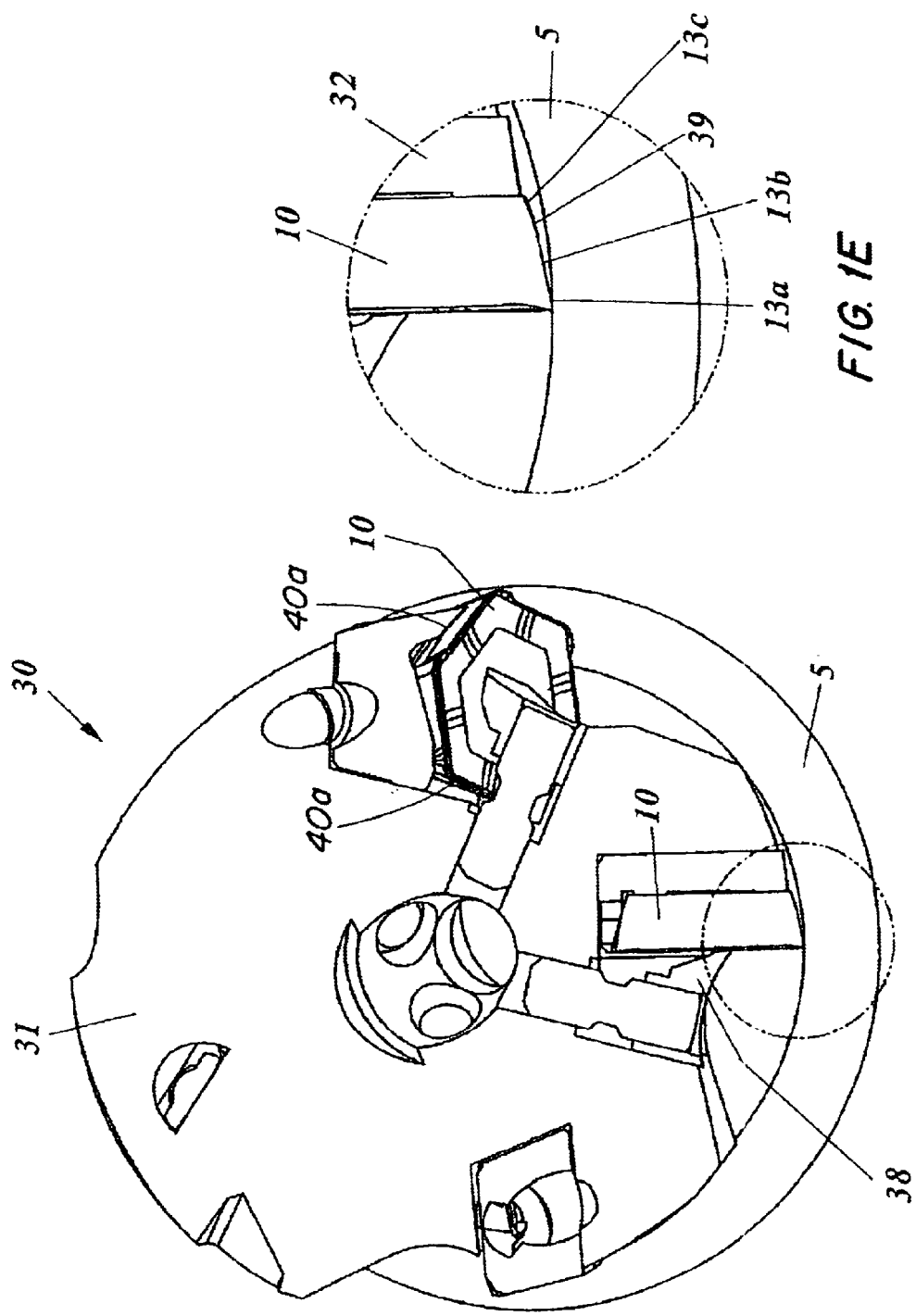
FIG. 1B shows a cross-section along line B—B in FIG. 1A in engagement with a workpiece.
FIG. 1E shows a magnification of a part of the milling tool and the workpiece indicated by a circle in FIG. 1B.

Each cassette has a cutting insert pocket, which comprises a primarily planar base surface 40 and two shoulders 40a projecting from respective edges of the base surface and against which a respective insert 10 can abut (see FIG. 1B). The shoulders form an acute internal angle between each other for abutment against alternate edge surfaces of the cutting insert. A through-going hole provided in the cassette 32 is provided next to the pocket for receiving a fastening screw 33 to secure the cassette in the holder 31 which is known per se. The cassette is adjustable in the axial direction of rotation with the assistance of a first wedge 37. The cassette is provided in the holder at a positive axial angle to provide for a favorable chip flow.

A second wedge 38 is provided to hold the cutting insert 10 in the pocket. When the cutting Insert is to be indexed, a screw 38a, which controls the second wedge 38, is partly unscrewed until the cutting insert can be drawn by hand outwardly in a radial direction (with reference to the axis of rotation), and the cutting insert can be rotated about the axis of the screw 38a in steps corresponding to 60° anticlockwise, such that a new main cutting edge gets into active cutting position. For instance in FIG. 1A, the main edge 16F is in active cutting position; rotation of the cutting edge would move the main cutting edge 16E from an inactive to an active position. Then the cutting insert is pushed into the pocket and the screw retightened. The cutting inserts 10 shall be located in the holder at a setting angle Q, see FIG., 1C, of about 53–63°, for obtaining clearance for the inactive cutting corner 34 disposed next to the inactive main cutting edge 16E of the cutting insert 10.

The cutting insert 10 shown in FIGS. 2A to 2G has a substantially hexagonal basic shape and comprises an upper surface 11, a bottom surface 12 and an edge surface or clearance surface generally designated 13 and substantially interconnecting the upper surface 11 and the bottom surface 12. The cutting insert 10 has a positive geometry, that is, the bottom surface 12 is smaller than the upper surface 11 so the edge surface provides clearance from a workpiece 5. The upper surface 11 comprises a first chip-upsetting surface 14 extending along the main cutting edge structure 16 of the cutting Insert 10 (see FIG. 2D). In addition, the upper surface 11 comprises a rake face or first chip surface 15 which slopes inwardly and downwardly from the chip-upsetting surface 14. The surface 14 constitutes the most peripheral part of the upper surface 11.

The intersection line of the first chip-upsetting surface 14 and the edge surface 13 forms the main cutting edge structure 16, which is defined by six substantially identical main edges 16A–16F. The rake face 15 is concavely curved and runs inwardly from the chip-upsetting surface to a central planar part 11A of the insert 10. The intersection of the rake face 15 with the chip-upsetting surface 14 forms a transition edge 26. The chip surface may alternatively have other shapes. Cutting corners 34 are provided in the region of the intersection between two adjacent edge surfaces 13. The upper parts of the cutting corners lie in a common plane P oriented parallel to the bottom surface 12. A plurality of projections or recesses (not shown) can be formed in the rake face 15 to reduce the transport of heat from the chip to the cutting insert.

Each adjacent pair of main cutting edges 16A–16F forms an internal obtuse angle α, about 120° (FIG. 2A). Each main cutting edge is substantially parallel to a corresponding line defined by the intersection between the edge surface 13 and the bottom surface 12 (see FIG. 2B).

The edge surface 13 comprises six segments. An upper or first portion 13a of each segment of the edge surface 13 situated immediately below the respective main cutting edge forms a first clearance angle β with a plane P0 oriented perpendicularly to the bottom surface 12 of the cutting insert (FIG. 2D). The clearance angle β is at least 5°. The six, essentially planar, first portions 13a converge towards the bottom surface 12. The portion 13a connects to the chip-upsetting surface 14 at the respective main cutting edge 16A–16F. An elongated recess 25 formed in the edge surface 13 separates the first portion 13a from a second portion 13b of the edge surface. A radius of about 1 mm defines the recess 25. The second portion 13b of the edge surface forms an angle σ with the plane P0 (FIG. 2D). The angle σ is larger than the angle β and is at least 10°. The recess 25 runs parallel to the main cutting edge 16 from a concave portion 36 of one cutting corner 34 to the next cutting corner 34 but does not extend around that next cutting corner (FIG. 2A).

Figure 1C:
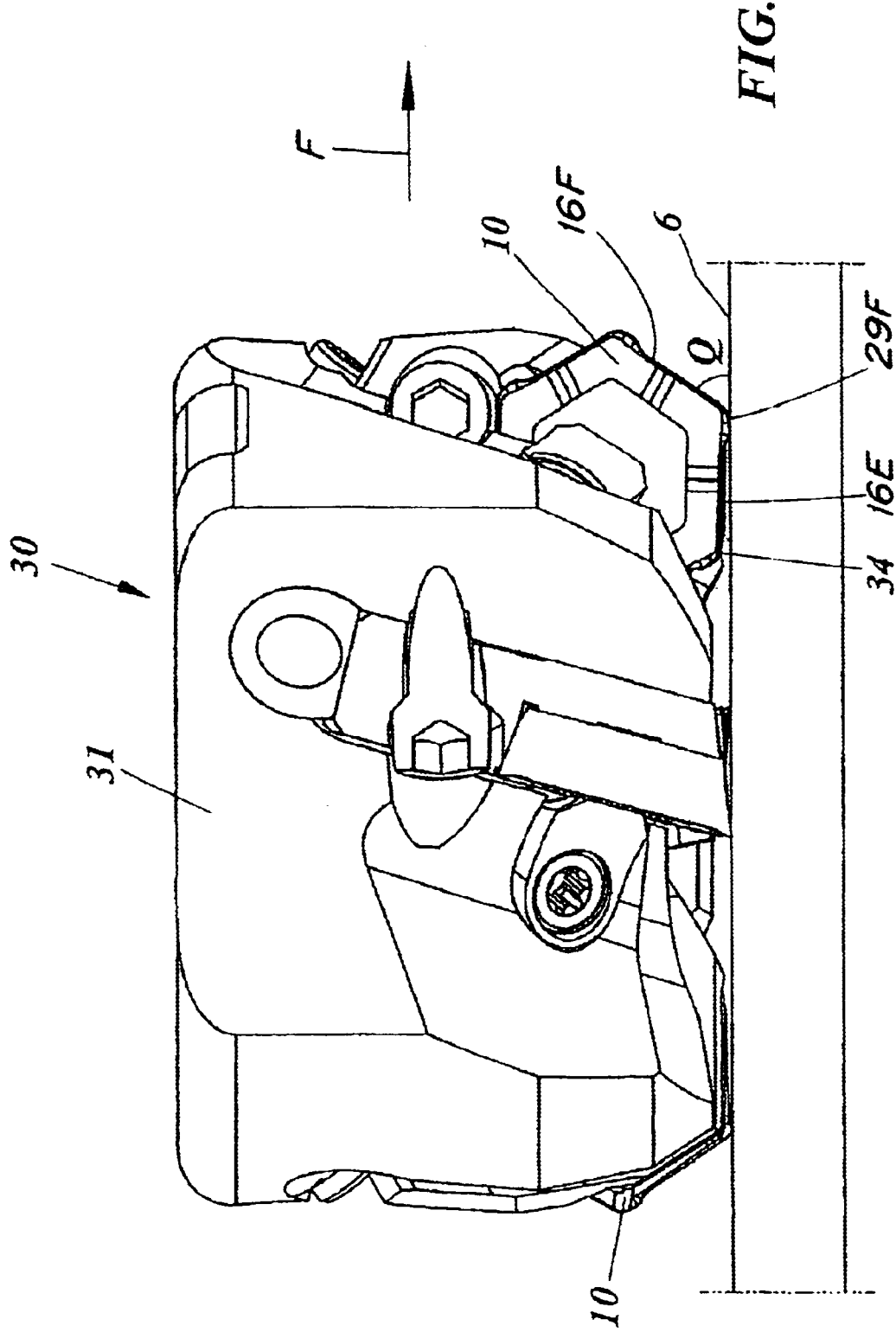
FIG. 1C shows a cross-section along line C—C in FIG. 1A.
Figure 1D:
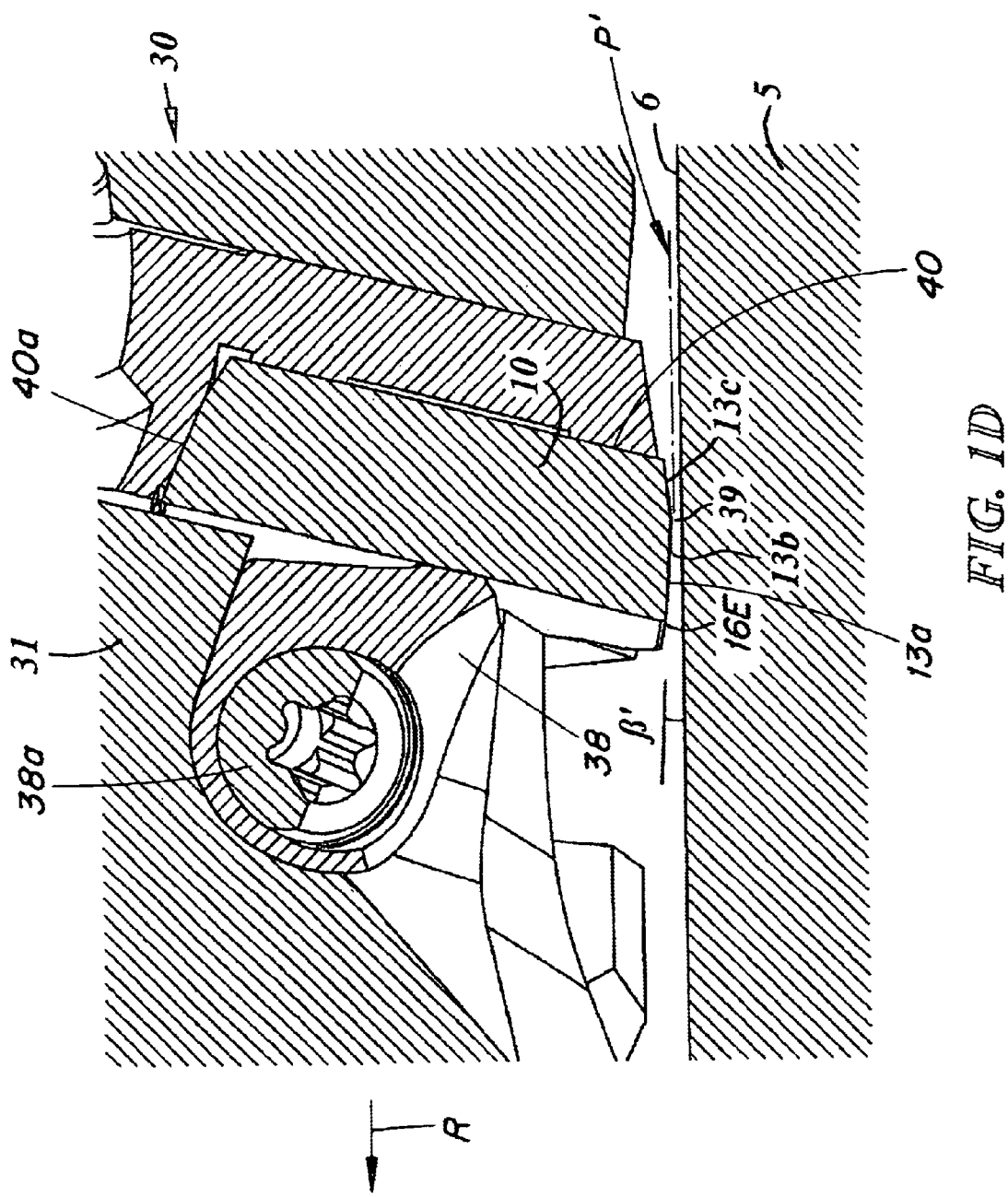
FIG. 1D shows a cross-section along line D—D in FIG. 1A.
Figure 2G:
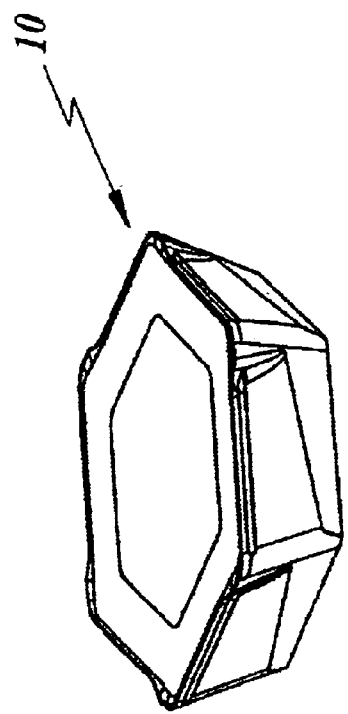
FIGS. 2F and 2G show the cutting insert in a bottom view and in a perspective view, respectively.
Figure 2C:
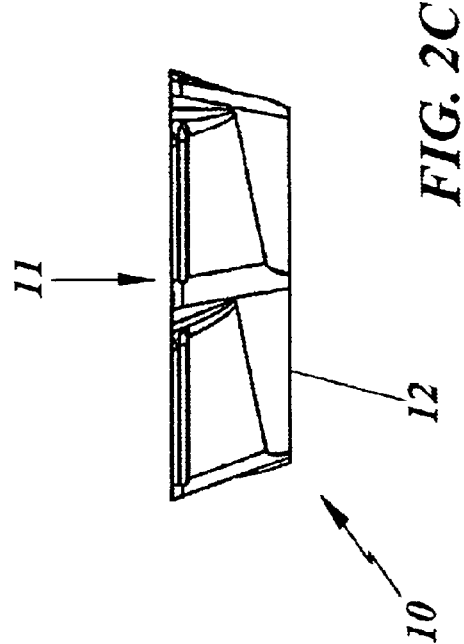
Figure 2F:
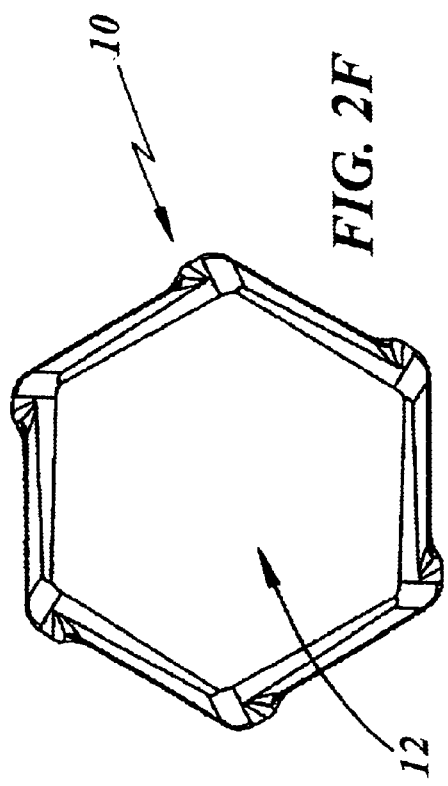

A third portion 13c of the edge surface 13 connects to the second portion 13b via a break, rounding or transition 39 which defines a peak of the convex profile and where the angle is changed by about 10° (see FIGS. 1D and 2B), wherein the second and third portions 13b and 13c form a clearance surface of generally convex profile (see FIG. 1D). The insert-receiving pocket is configured such that when an insert is seated therein, a plane P' which extends perpendicular to the axis of rotation and which contains the transition crest 39 of the clearance surface associated with a forwardmost inactive main cutting edge 16E is offset from such inactive cutting edge 16E in an axially forward direction, i.e., toward the workpiece, as shown in FIG. 1D. As a result, the transition 39 serves as an impact protection for the underlying main cutting edge 16 of the cutting insert, relative to the generated surface 6 of the workpiece 5.

The third portion 13c of the edge surface 13 forms an angle ε of about 20° with the plane P0 (see FIG. 2E). At each cutting corner 34, the third portion 13c of the edge surface 13 extends to a secondary cutting edge or wiper edge generally designated 27 (see FIG. 2E). There are five secondary cutting edges 27A–E which are associated with respective main cutting edges 16A–E.

Figure 3A:
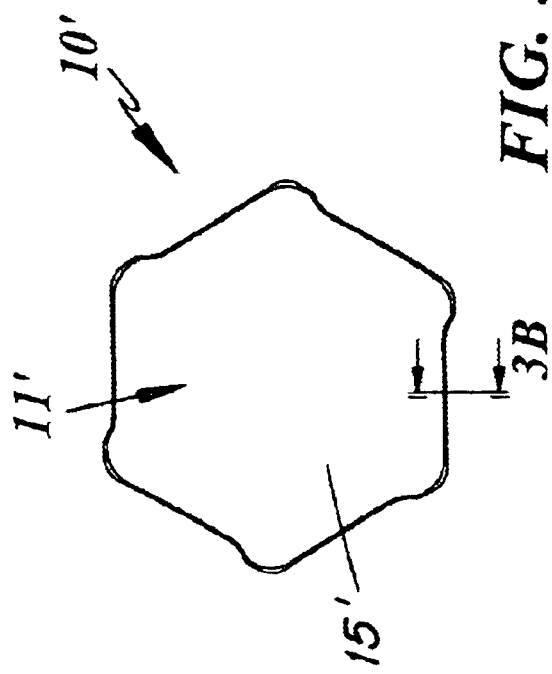
FIG. 3A shows a plane view of an alternative embodiment of a cutting insert according to the present invention.
Figure 3B:
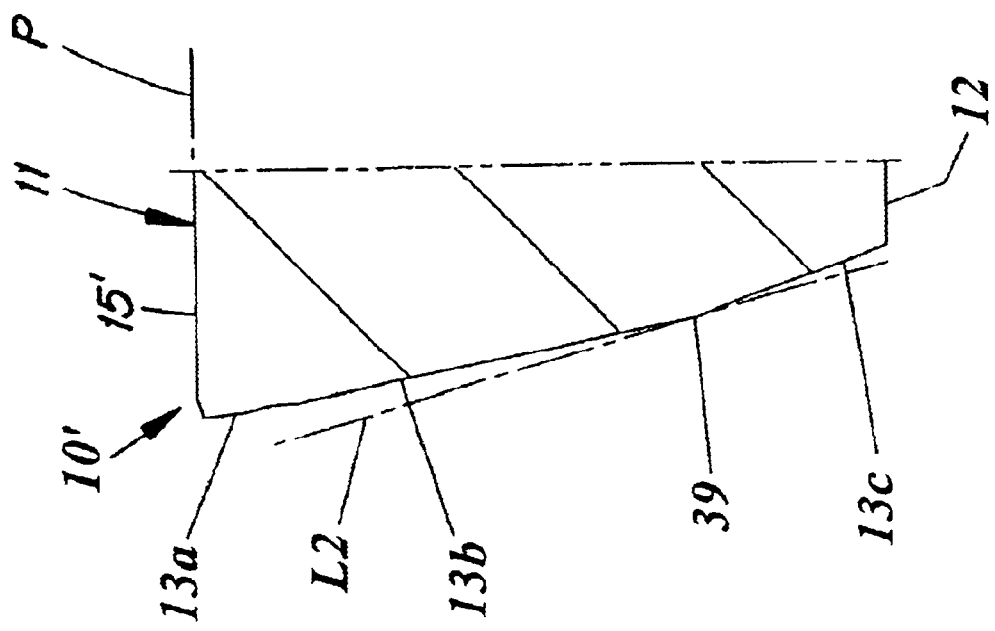
FIG. 3B shows a cross-section taken along the line 3B in FIG. 3A.

The insert's bottom surface 12 defines a plane, and a line L2 can be drawn which intersects said plane and touches the insert only at the transition 39 of the clearance surface (FIG. 3B). The secondary cutting edge 27 connects via a second chip-upsetting surface 28 to a second rake face 29, which in turn connects to the rake face surface 15 (FIG. 2E). The rake face 15 forms in this example an angle with the plane P of about 17° while the second rake face 29 forms an angle of about 7° with the plane P. The second chip-upsetting surface 28 slopes more negatively than the first chip-upsetting surface 14. The cutting insert 10 has a first edge angle δ at the main cutting edge 16 and a second edge angle γ at the secondary cutting edge 27 (FIG. 2E). The first edge angle δ is about 67° and the second edge angle γ is about 63°. Said chip-upsetting surfaces 14 and 28 connect to each other at the area of a bisector B of the cutting corner 34.

Each secondary cutting edge 27 is provided on a respective protruding portion 35, which in a top view protrudes a greatest distance W from an imaginary extension line of the main cutting edge structure 16. The distance W is 0.5–1.0 mm. The protruding portion 35 is asymmetrical relative to the bisector B of the cutting corner 34. As the secondary cutting edge 27 moves away from the bisector B of the respective cutting corner 34, it diverges continuously from an imaginary extension line of the adjacent inactive main cutting edge. For example, in FIG. 2A, the secondary cutting edge 27F, as it moves farther from the bisector B of its respective corner diverges relative to an imaginary extension of the inactive main cutting edge 16E.

A concave transition 36 (see FIG. 2A) is provided between the secondary cutting edge (for example edge 27F) and the trailing main cutting edge (for example 16E), the term "trailing" being considered with reference to the direction of feed F shown in FIG. 1C. The edge 16E is passive when the edge 27F is active; however the edge 16E is susceptible to impacts from the workpiece. The protruding portion 35 is provided in the region of the intersection between two adjacent identical main cutting edges, for example 16F and 16E.

The distance L1 between two diametrically opposed main cutting edges, 16C and 16F for example, is the same for all combinations of diametrically opposed main cutting edges.

FIGS. 3A, 3B shows a cutting insert 10' according to an alternative embodiment according to the present invention. The appearance of the upper of the surface 11' of the cutting insert 10' differs from the cutting insert 10 in that the rake face 15' lies in the plane P. The remainder of the cutting insert 10' is identical with the cutting insert 10.

By using the teachings of the present invention, a cutting insert and a milling tool are provided which entail economically favorable cutting inserts with preferably more than four cutting edges where strong cutting corners 34 are combined with wiper edges 27 for producing fine surfaces. Consequently, for example, the clearance surface 13b of the passive cutting edge 16E in the cutting insert 10, 10' forms a negative angle β' with the generated surface 6 of the workpiece 5, see FIG. 1D.

Figure 4B:
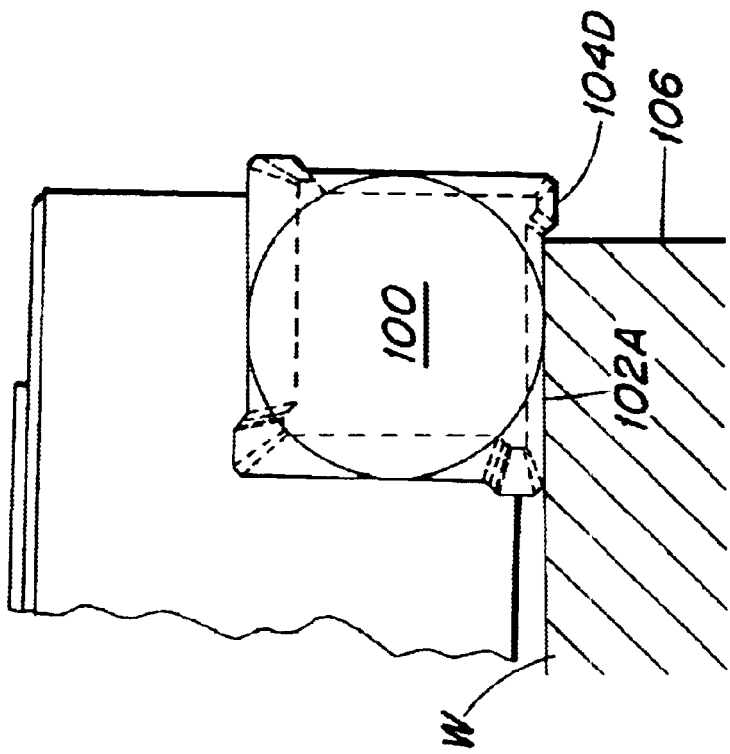
FIG. 4B shows the insert of FIG. 4A after a secondary cutting edge thereof moves out of contact with the workpiece.
Figure 4A:
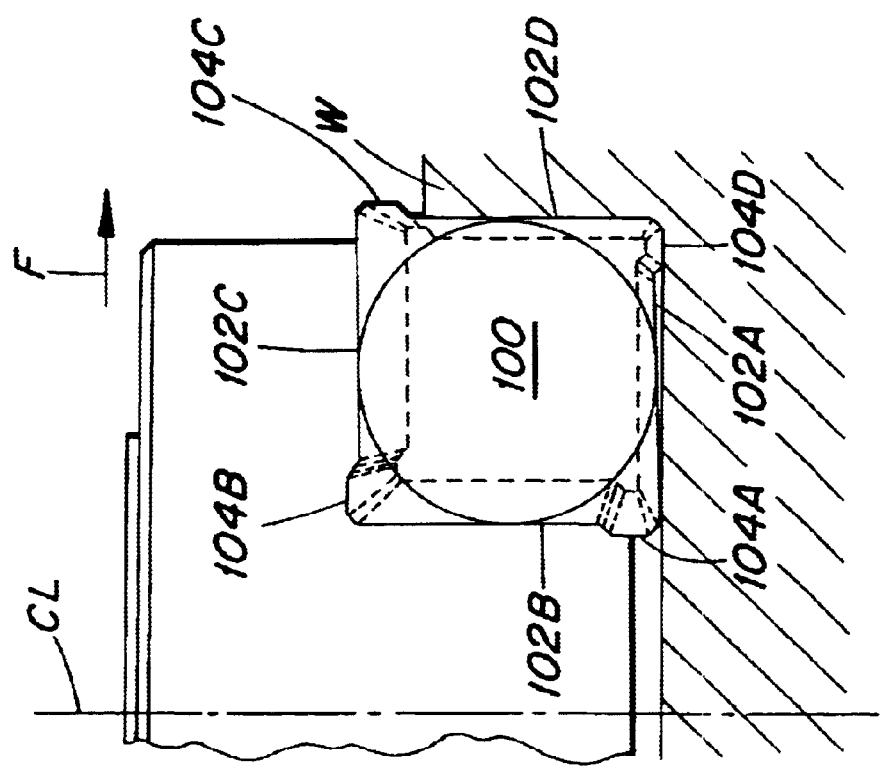
FIG. 4A shows a prior art insert performing a milling operation.

During rough milling with such a milling tool in a machine with poor stability, the transition or crest line 39 of the cutting insert can abut against the workpiece 5 when the secondary cutting edge 27 has passed the edge of the workpiece, without damaging the underlying main cutting edge 16E. That is, with reference to FIG. 1C, during a milling operation, the cutting is performed mainly by the active main edge 16F and the active secondary edge 27F, with the inactive main edge 16E disposed out of contact with the workpiece. If the secondary edge 27F should come out of contact with the workpiece, e.g., by traveling past an edge of the workpiece, then the insert may be pressed downwardly by a built-up spring force in the machine as explained earlier in connection with FIG. 4B. However, in accordance with the present invention, instead of the cutting edge 16E striking the workpiece 6 (and possibly becoming chipped), the transition or crest 39 of the convex clearance surface which trails the main cutting edge 16E (i.e., "trails" with reference to the direction of rotation R—see FIG. 1D) will strike the workpiece instead of the edge 16E, since the edge 16E is located farther from the workpiece than is the transition 39 due to the positive axial angle at which the insert is oriented.

Although the present invention has been described in connection with preferred embodiments thereof, it is understood for the person skilled in the art that modifications not specifically described can be made without departing from the scope of the invention such as it is defined in the appended claims. For example, it is possible to provide the cutting insert with a through-going hole for receiving a screw as an alternative to the shown clamp 38.

What is claimed is:

1. A milling insert comprising a body having upper and bottom surfaces interconnected by an edge surface structure, a transition between the upper surface and the edge surface structure forming a main cutting edge structure comprised of a plurality of identical main cutting edges, the body further including a plurality of protruding portions, each protruding portion disposed at a corner toward which two of the main cutting edges converge, each protruding portion forming a secondary cutting edge disposed outside of an intersection of imaginary extensions of the two main cutting edges, the secondary cutting edge being joined to a first of the two main cutting edges by a transition edge; the edge surface structure forming a plurality of clearance surfaces for respective ones of the main cutting edges, each clearance surface including a first portion extending from a respective main cutting edge, a second portion disposed behind the first portion with reference to the cutting edge, and a third portion extending from the second portion in a direction toward the bottom surface, the second and third portions together forming a generally convex profile, wherein the first portions of the respective clearance surfaces extend convergingly toward the bottom surface, wherein the first and second portions of each clearance surface form respective first and second acute angles with a line extending perpendicular to a plane defined by the bottom surface, the first acute angle being smaller than the second acute angle.

2. The milling insert according to claim 1 wherein the upper surface includes a first rake surface disposed inwardly of each main cutting edge, the first portion of each clearance surface forming a first edge angle with a respective first rake surface, the third portion of each clearance surface extending to the secondary cutting edge; the secondary cutting edge being formed by a transition between the third portion and a second rake surface of the upper surface; the third portion forming a second acute edge angle with the second rake surface; the second edge angle being smaller than the first edge angle.

3. The milling insert according to claim 2 wherein the first edge angle is substantially 67°, and the second edge angle is substantially 63°.

4. The milling insert according to claim 3 wherein each adjacently disposed pair of main cutting edges forms an obtuse angle with one another.

5. The milling insert according to claim 4 wherein the obtuse angle is substantially 120°.

6. The milling insert according to claim 1 wherein the upper surface includes a first chip-upsetting surface extending along each main cutting edge, and a second chip-upsetting surface extending along each secondary cutting edge, each of the first chip-upsetting surfaces being connected to a respective second chip upsetting surface.

7. The milling insert according to claim 1 wherein the first and second portions of each clearance surface are separated from one another by a recess.

8. A milling tool for milling a workpiece, comprising:
a holder defining an axis of rotation and forming a plurality of pockets around an outer periphery of a forward end thereof; and
a plurality of milling inserts secured in respective ones of the pockets, each milling insert comprising a body having upper and bottom surfaces interconnected by an edge surface structure, a transition between the upper surface and the edge surface structure forming a main cutting edge structure comprised of a plurality of identical main cutting edges, the body further including a plurality of protruding portions, each protruding portion disposed at a corner toward which two of the main cutting edges converge, each protruding portion forming a secondary cutting edge disposed outside of an intersection of imaginary extensions of the two main culling edges, the secondary cutting edge being joined to a first of the two main cutting edges by a transition edge;

the edge surface structure forming a plurality of clearance surfaces for respective ones of the main cutting edges, each clearance surface including two portions together forming a generally convex profile defining a transition crest therebetween, wherein the transition crest is situated closer to the bottom surface than to the upper surface;

each insert including a forwardmost inactive main cutting edge having one of the clearance surfaces disposed therebehind with reference to a direction of rotation of the holder, a plane oriented perpendicularly to the axis of rotation and containing the transition crest of the clearance surface associated with the axially forwardmost inactive main cutting edge being disposed axially forwardly with respect to such axially forwardmost inactive main cutting edge.

9. The milling tool according to claim 8, wherein the upper surface includes a first rake surface disposed inwardly of each main cutting edge, the first portion of each clearance surface forming a first edge angle with a respective first rake surface, the third portion of each clearance surface extending to the secondary cutting edge, the secondary cutting edge being formed by a transition between the third portion and a second rake surface of the upper surface, the third portion forming a second acute edge angle with the second rake surface, the second edge angle being smaller than the first edge angle.

10. The milling insert tool to claim 9 wherein the first edge angle is substantially 67°, and the second edge angle is substantially 63°.

11. A milling insert comprising a body having upper and bottom surfaces interconnected by an edge surface structure, a transition between the upper surface and the edge surface structure forming a main cutting edge structure comprised of a plurality of identical main cutting edges, the body further including a plurality of protruding portions, each protruding portion disposed at a corner toward which two of the main cutting edges converge, each protruding portion forming a secondary cutting edge disposed outside of an intersection of imaginary extensions of the two main cutting edges, the secondary cutting edge being joined to a first of the two main cutting edges by a transition edge; the edge surface structure forming a plurality of clearance surfaces for respective ones of the main cutting edges, each clearance surface including two portions together forming a generally convex profile, wherein a crest of the convex profile is situated closer to the bottom surface than to the upper surface.

* * * * *